United States Patent
Dai et al.

(10) Patent No.: US 12,158,832 B2
(45) Date of Patent: Dec. 3, 2024

(54) METHOD, ELECTRONIC DEVICE, AND COMPUTER PROGRAM PRODUCT FOR MANAGING STORAGE DEVICE

(71) Applicant: EMC IP Holding Company LLC, Hopkinton, MA (US)

(72) Inventors: Cherry Dai, Chengdu (CN); Arthur Fangbin Zhou, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 519 days.

(21) Appl. No.: 17/566,393

(22) Filed: Dec. 30, 2021

(65) Prior Publication Data

US 2023/0095807 A1 Mar. 30, 2023

(30) Foreign Application Priority Data

Sep. 28, 2021 (CN) .......................... 202111146119.6

(51) Int. Cl.
*G06F 11/34* (2006.01)
*G06F 11/30* (2006.01)
(52) U.S. Cl.
CPC ...... *G06F 11/3442* (2013.01); *G06F 11/3037* (2013.01)
(58) Field of Classification Search
None
See application file for complete search history.

(56) References Cited

U.S. PATENT DOCUMENTS

| | | | | |
|---|---|---|---|---|
| 8,620,921 | B1 * | 12/2013 | Susarla | ................. G06F 16/212 |
| | | | | 707/738 |
| 8,856,335 | B1 * | 10/2014 | Yadwadkar | ......... H04L 67/1008 |
| | | | | 707/607 |
| 10,203,895 | B2 * | 2/2019 | Ohgushi | ................. G06F 11/14 |
| 11,340,939 | B1 * | 5/2022 | Barker, Jr. | ............ G06F 3/0647 |
| 11,397,643 | B2 * | 7/2022 | Nakamura | ............ G06F 3/0659 |
| 11,809,299 | B2 | 11/2023 | Dai et al. | |

* cited by examiner

*Primary Examiner* — Van H Nuyen
(74) *Attorney, Agent, or Firm* — Amin, Turocy & Watson, LLP (57) ABSTRACT

Management of a storage device is disclosed. A method for managing a storage device includes acquiring evaluation information for a candidate fitting model in candidate fitting models. The evaluation information indicates at least a historical fitting degree between the candidate fitting model and historical data. A model selection strategy is determined based on the evaluation information. The model selection strategy indicates at least a probability that the candidate fitting models is selected for fitting target data. The target data indicates a storage state of the storage device over a first time period. Further, based on the model selection strategy, a target fitting model is determined from the candidate fitting models for use in determining a storage state of the storage device over a second time period. In this manner, the fitting model suitable for actual business data can be determined more efficiently, and additional system overhead can be avoided.

20 Claims, 4 Drawing Sheets

METHOD, ELECTRONIC DEVICE, AND COMPUTER PROGRAM PRODUCT FOR MANAGING STORAGE DEVICE

RELATED APPLICATION

The present application claims the benefit of priority to Chinese Patent Application No. 202111146119.6, filed on Sep. 28, 2021, which application is hereby incorporated into the present application by reference herein in its entirety.

TECHNICAL FIELD

Embodiments of the present disclosure relate to the field of storage technologies and, more specifically, to a method, an electronic device, and a computer program product for managing a storage device.

BACKGROUND

With the continuous development of Internet technologies, the demand for data processing and applications continues to grow, and the amount of data people need and generate has increased significantly. Now, people have realized the importance of storage management. At present, a known storage management method is to predict the storage state of a storage device over a future time period based on historical data of the storage device in order to manage the storage device based on the predicted storage state.

SUMMARY

According to example embodiments of the present disclosure, a solution for managing a storage device is provided. By considering previously determined evaluation information associated with at least one candidate fitting model, the solution determines from a set of candidate fitting models a target fitting model for predicting a storage state of a storage device. Compared to conventional technical solutions, the solution according to the present disclosure can more efficiently determine the fitting model most suitable for actual business data and can avoid additional system overhead.

In a first aspect of the present disclosure, a method for managing a storage device is provided. This method includes acquiring evaluation information for at least one candidate fitting model in a set of candidate fitting models. The evaluation information indicates at least a historical fitting degree between the at least one candidate fitting model and a set of historical data. The set of historical data indicates a storage state of the storage device over at least one historical time period. The method further includes determining a model selection strategy based on the evaluation information. The model selection strategy indicates at least a probability that the set of candidate fitting models is selected for fitting target data. The target data indicates a storage state of the storage device over a first time period. Further, the method further includes determining, based on the model selection strategy, a target fitting model from the set of candidate fitting models for use in determining a storage state of the storage device over a second time period.

In a second aspect of the present disclosure, an electronic device is provided. The electronic device includes a processor and a memory coupled to the processor, the memory having instructions stored therein that, when executed by the processor, cause the device to execute actions. The actions include acquiring evaluation information for at least one candidate fitting model in a set of candidate fitting models. The evaluation information indicates at least a historical fitting degree between the at least one candidate fitting model and a set of historical data. The set of historical data indicates a storage state of a storage device over at least one historical time period. The actions further include determining a model selection strategy based on the evaluation information. The model selection strategy indicates at least a probability that the set of candidate fitting models is selected for fitting target data. The target data indicates a storage state of the storage device over a first time period. In addition, the actions further include determining, based on the model selection strategy, a target fitting model from the set of candidate fitting models for use in determining a storage state of the storage device over a second time period.

In a third aspect of the present disclosure, a computer program product is provided. The computer program product is tangibly stored on a computer-readable medium and includes machine-executable instructions that, when executed, cause a machine to perform the method according to the first aspect.

The Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, the same or similar accompanying numerals indicate the same or similar elements, wherein.

DETAILED DESCRIPTION

Embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be construed as "at least one embodiment." The terms "first," "second," and the like may refer to different or the same objects. Other explicit and implicit definitions may also be included below.

As described above, in conventional storage management methods, a storage device is managed by predicting a storage state of the storage device over a future time period. Known methods usually try different fitting models one by one in a predetermined order to process historical data and determine a fitting model suitable for actual business data, so that the fitting model can be used to predict a storage state of the storage device. However, since different fitting models have different fitting degrees for different types of actual business data, such conventional methods usually need to try many times to determine the fitting model that is suitable for the actual business data, which leads to undesired system overhead. In addition, such conventional methods often stop trying other new fitting models after finding a fitting model that satisfies the minimum requirement, so the final fitting model used for prediction may not be the fitting model most suitable for the actual business data among candidate fitting models, which may affect the prediction results.

Embodiments of the present disclosure provide a solution for managing a storage device to solve one or more of the above problems and other potential problems. In the present disclosure, by considering previously determined evaluation information associated with at least one candidate fitting model, a target fitting model is determined from a set of candidate fitting models for use in predicting a storage state of the storage device over a future time period. Compared with the conventional solutions described above, since previously determined evaluation information is considered in the model selection process, the fitting model most suitable for actual business data can be determined more efficiently from a set of candidate fitting models according to the solution of the present disclosure, and the number of trials on candidate fitting models in the subsequent prediction process can be reduced to avoid undesired system overhead.

Some example embodiments of the present disclosure will continue to be described below with reference to the accompanying drawings.

Figure 1:
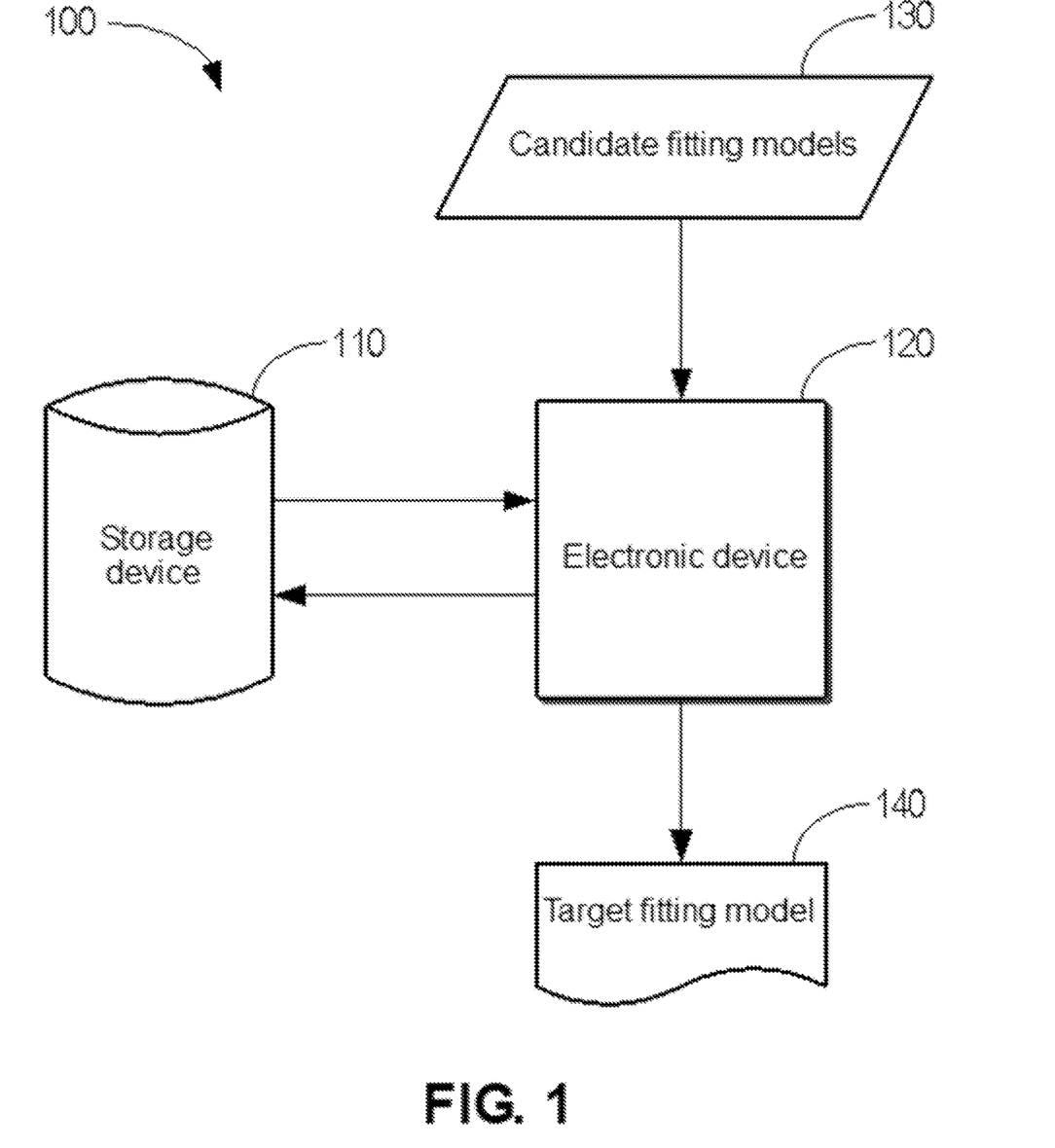
FIG. 1 illustrates a block diagram of an example environment according to some embodiments of the present disclosure.

FIG. 1 illustrates a block diagram of example environment 100 according to some embodiments of the present disclosure. As shown in FIG. 1, example environment 100 may include, in general, storage device 110 and electronic device 120. In some embodiments, storage device 110 may include one or more physical storage devices. Examples of physical storage devices include, but are not limited to: Solid State Disks (SSD), Fiber Channel (FC) disks, Serial Advanced Technology Attachment (SATA) disks, Serial Attached Small Computer System Interface (SAS) disks, and the like. In some embodiments, storage device 110 may be configured as a redundant array of independent disks (RAID). It should be understood that storage device 110 may also be implemented in any other suitable form, and the scope of the present disclosure is not limited in this regard.

As shown in FIG. 1, electronic device 120 may, for example, be communicatively coupled to storage device 110 to receive data from storage device 110 and/or send data to storage device 110. By considering previously determined evaluation information associated with at least one candidate fitting model 130, electronic device 120 according to the present disclosure determines, from a set of candidate fitting models 130, target fitting model 140 for predicting a storage state of storage device 110. This will be described in further detail below in conjunction with FIGS. 2 to 3. In some embodiments, electronic device 120 may be a device with computing functions, such as an electronic control module, a personal computer, a workstation, a server, etc. It should be understood that although electronic device 120 is illustrated as being located outside storage device 110 in FIG. 1, electronic device 120 may also be implemented as being located within storage device 110, or being part of storage device 110, and the scope of the present disclosure is not limited in this regard.

Figure 2:
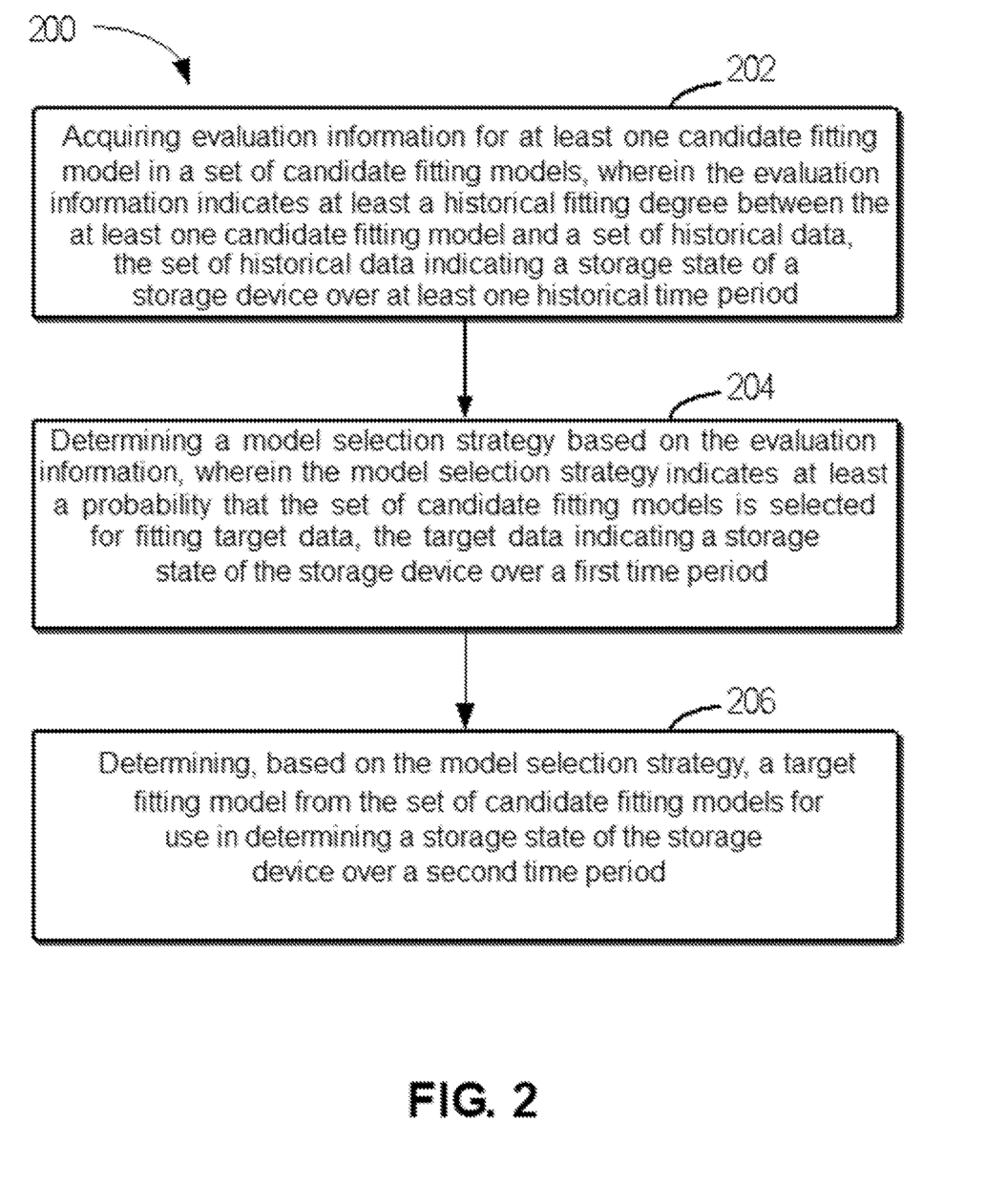
FIG. 2 illustrates a flow chart of a method for managing a storage device according to some embodiments of the present disclosure.

FIG. 2 illustrates a flow chart of method 200 for managing storage device 110 according to some embodiments of the present disclosure. For example, method 200 may be executed by electronic device 120 as shown in FIG. 1. It should be understood that method 200 may also include additional blocks not shown, and/or may omit the blocks shown. The scope of the present disclosure is not limited in this regard.

At block 202, electronic device 120 acquires evaluation information for at least one candidate fitting model 130 in a set of candidate fitting models 130, wherein the evaluation information indicates at least a historical fitting degree between the at least one candidate fitting model 130 and a set of historical data, the set of historical data indicating a storage state of storage device 110 over at least one historical time period.

In some embodiments, electronic device 120 may be communicatively coupled, for example, to a recording device (not shown in FIG. 1) for storing evaluation information associated with candidate fitting model 130. For example, after candidate fitting model 130 is evaluated, the evaluation information obtained from the evaluation may be stored by the recording device, so that previously determined evaluation information can be used in the subsequent model selection process. Electronic device 120 may acquire, from the recording device, the evaluation information for the at least one candidate fitting model 130 in the set of candidate fitting models 130 by sending a request to the recording device. In some embodiments, electronic device 120 itself may also be configured to store the evaluation information associated with candidate fitting model 130. It should be understood that the evaluation information associated with candidate fitting model 130 may also be stored and provided by any other suitable device, and that electronic device 120 may acquire the evaluation information from that device, and the scope of the present disclosure is not limited in this regard.

In some embodiments, candidate fitting model 130 may include a regression model for regression analysis of storage states of storage device 110 over historical time periods. Examples of the regression model include, but are not limited to, linear regression models, autoregressive moving average (ARMA) models, autoregressive integrated moving average (ARIMA) models, and the like. It should be understood that candidate fitting model 130 may also include any other suitable models for analysis of storage states of storage device 110 over historical time periods, and the scope of the present disclosure is not limited in this regard.

In some embodiments, the historical time period is a period of time in the past and may have a predetermined length of time. The historical time period may be, for example, a day in the past, a week in the past, a month in the past, etc. In some embodiments, the length of the historical time period may be selected and set by users. The scope of the present disclosure is not limited in this regard.

In some embodiments, the historical data may include storage state data collected by storage device 110 at a predetermined time interval over historical time periods, such as the usage rate of the storage device. Depending on the length of the historical time period, the predetermined time interval may be, for example, an hour, a day, etc., and the scope of the present disclosure is not limited in this regard.

In some embodiments, the evaluation information may indicate a historical fitting degree between candidate fitting model 130 and corresponding historical data in the set of historical data. In some embodiments, by calculating metrics such as the root-mean squared value (RMS), the root-mean square error (RMSE) value, and the coefficient of determination (R2) value, electronic device 120 measures the historical fitting degree between candidate fitting model 130 and the corresponding historical data, and the values of the above metrics can be stored as the evaluation information. It should be understood that the historical fitting degree between candidate fitting model 130 and the corresponding historical data may also be measured in any other suitable manner, and the scope of the present disclosure is not limited in this regard.

In some embodiments, the evaluation information may also indicate the time overhead used by the at least one candidate fitting model 130 to fit the set of historical data. For example, electronic device 120 may record time information, such as the time required to construct candidate fitting model 130 and/or the time spent on making predictions using constructed candidate fitting model 130, to measure the time overhead of candidate fitting model 130. It should be understood that the time overhead of candidate fitting model 130 may also be measured in any other suitable manner, and the scope of the present disclosure is not limited in this regard.

In some embodiments, the evaluation information may also indicate the storage overhead used by the at least one candidate fitting model 130 to fit the set of historical data. For example, electronic device 120 may record the storage capacity required to fit the historical data using candidate fitting model 130, so as to measure the storage overhead of candidate fitting model 130. It should be understood that the storage overhead of candidate fitting model 130 may also be measured in any other suitable manner, and the scope of the present disclosure is not limited in this regard.

In some embodiments, the evaluation information may also indicate the moment at which the at least one candidate fitting model 130 is selected for determining the storage state of storage device 110, and this moment may be referred to as the "most recently used moment." As will be described in detail below, electronic device 120 will determine one candidate fitting model 130 from the set of candidate fitting models 130 based on the evaluation information so as to determine a storage state of storage device 110 over a future time period. Thus, electronic device 120 may record the moment at which this candidate fitting model 130 is selected for determining the storage state of storage device 110.

The evaluation metrics that the evaluation information may include are illustratively described above. In some embodiments, the evaluation information may include at least one of the evaluation metrics described above. It should be understood that the evaluation information may also include evaluation metrics that are not listed, and/or may omit the listed evaluation metrics. The scope of the present disclosure is not limited in this regard.

At block 204, electronic device 120 determines a model selection strategy based on the evaluation information, wherein the model selection strategy indicates at least a probability that the set of candidate fitting models 130 is selected for fitting target data, the target data indicating a storage state of storage device 110 over a first time period.

In some embodiments, the first time period is a period of time in the past and may have a predetermined length of time. The first time period may be, for example, the most recent day, the most recent week, the most recent 30 days, the most recent calendar month, etc. In some embodiments, the first time period may be selected and set by users. The scope of the present disclosure is not limited in this regard.

In some embodiments, the target data may include storage state data collected by storage device 110 at a predetermined time interval during the first time period, such as the usage rate of the storage device. Depending on the length of the first time period, the predetermined time interval may be, for example, one hour, one day, etc., and the scope of the present disclosure is not limited in this regard.

In some embodiments, electronic device 120 may determine, based on the evaluation information, the probability that the candidate fitting models 130 are selected for fitting the target data as the model selection strategy. This will be described in further detail below in conjunction with FIG. 3.

At block 206, electronic device 120 determines, based on the model selection strategy, target fitting model 140 from the set of candidate fitting models 130 for use in determining a storage state of storage device 110 over a second time period.

In some embodiments, the second time period is a period of time in the past and may, for example, have a predetermined length of time. The second time period may, for example, be a day in the future, a week in the future, 30 days in the future, etc. In some embodiments, the second time period may be selected and set by users. The scope of the present disclosure is not limited in this regard.

In some embodiments, electronic device 120 may determine a first fitting model from the set of candidate fitting models 130 based on the model selection strategy. Electronic device 120 may use the determined first fitting model to fit the target data so as to determine a fitting degree between the first fitting model and the target data. Electronic device 120 may use the determined fitting degree between the first fitting model and the target data to update a historical fitting degree associated with the first fitting model in the evaluation information. Where the evaluation information also indicates the time overhead mentioned above, electronic device 120 may also, for example, use the time required to construct the first fitting model to update the time overhead associated with the first fitting model in the evaluation information. Depending on the evaluation metrics included in the evaluation information, electronic device 120 may also update the evaluation information in any other suitable manner, and the scope of the present disclosure is not limited in this regard.

In some embodiments, electronic device 120 may compare the determined fitting degree between the first fitting model and the target data with a predetermined threshold. This predetermined threshold may be predetermined by users, or may use a default value, or may be adjusted during the execution of the method, and the scope of the present disclosure is not limited in this regard. If it is determined that this fitting degree is greater than or equal to the predetermined threshold, electronic device 120 may determine the first fitting model as target fitting model 140. If it is determined that this fitting degree is less than the predetermined threshold, electronic device 120 may update the model selection strategy based on the updated evaluation information. As an example, electronic device 120 may determine a new model selection strategy based on the updated evaluation information in a manner similar to that described with reference to block 204 so as to update the model selection strategy. Electronic device 120 may also update the model selection strategy in any other suitable manner, and the scope of the present disclosure is not limited in this regard. Electronic device 120 may determine target fitting model 140 from the set of candidate fitting models 130 in a manner similar to that described above and based on the updated model selection strategy. In some embodiments, electronic device 120 may perform the operations described above in an iterative manner to determine, from the set of candidate fitting models 130, target fitting model 140 whose fitting degree with the target data is greater than or equal to the predetermined threshold. In this way, electronic device 120 may update the evaluation information associated with candidate fitting model 130 in real time in the process of determining target fitting model 140 and adaptively adjust the model selection strategy based on the latest evaluation information, so that a fitting model most suitable for actual business data can be determined more efficiently from the set of candidate fitting models 130, and the number of trials on candidate fitting model 130 in the subsequent prediction process can be reduced to avoid undesired system overhead.

In some other embodiments, electronic device 120 may compare the determined fitting degree between the first fitting model and the target data with a predetermined threshold. This predetermined threshold may be predetermined by users, or may use a default value, or may be adjusted during the execution of the method, and the scope of the present disclosure is not limited in this regard. If it is determined that this fitting degree is greater than or equal to the predetermined threshold, electronic device 120 may determine the first fitting model as target fitting model 140. If it is determined that this fitting degree is less than the predetermined threshold, electronic device 120 may continue to select, based on the model selection strategy determined at block 204, one candidate fitting model 130 from the set of candidate fitting models 130 as the first fitting model, and repeat the above operations until target fitting model 140 whose fitting degree with the target data is greater than or equal to the predetermined threshold is determined from the set of candidate fitting models 130. In some embodiments, electronic device 120 may also use the fitting degree between the first fitting model and the target data to update the evaluation information. Electronic device 120 may determine, based on the updated evaluation information, target fitting model 140 from the set of candidate fitting models 130 for use in determining a storage state of storage device 110 over a third time period after the second time period. In this manner, electronic device 120 may consider the most recent evaluation information of previously tried candidate fitting model 130 in the process of determining target fitting model 140, and thus can more efficiently determine from the set of candidate fitting models 130 a fitting model most suitable for actual business data, so that the number of trials on candidate fitting model 130 in the subsequent prediction process can be reduced to avoid undesired system overhead.

Figure 3:
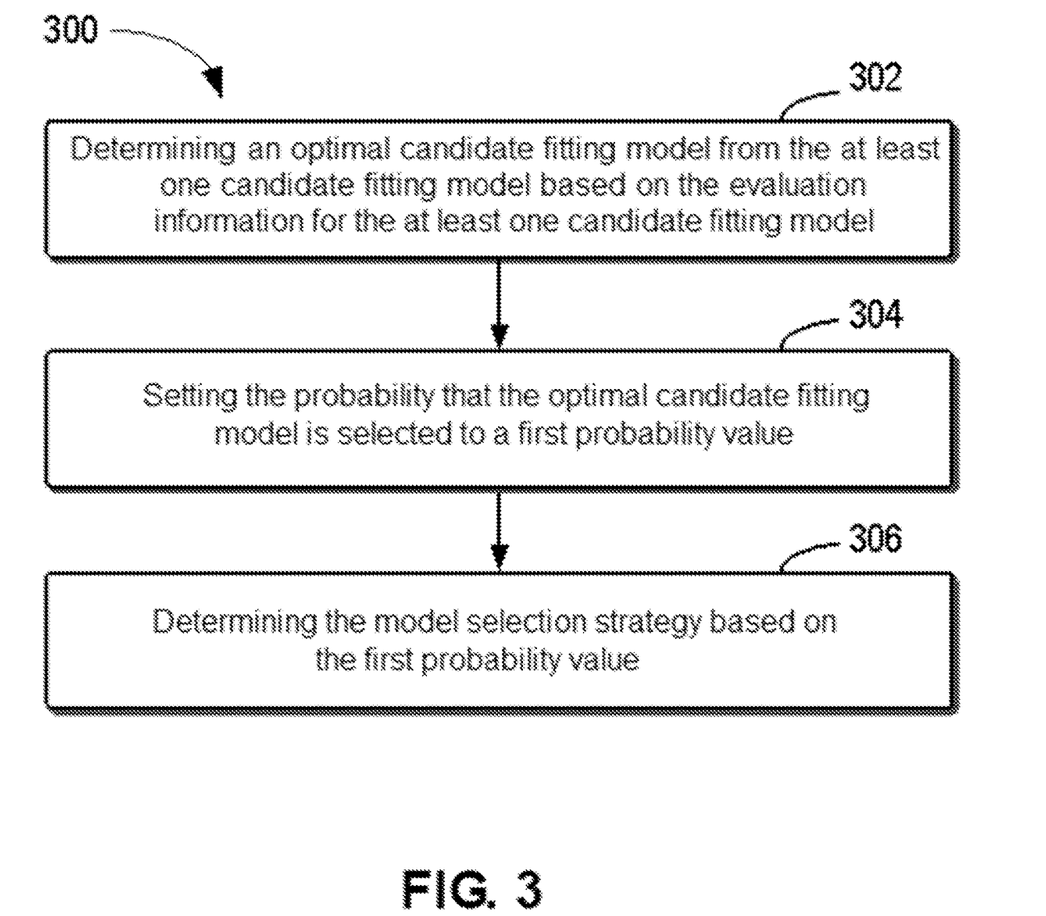
FIG. 3 illustrates a flow chart of a method for determining a model selection strategy according to some embodiments of the present disclosure.

FIG. 3 illustrates a flow chart of method 300 for determining a model selection strategy according to some embodiments of the present disclosure. For example, method 300 may be implemented as an example of block 204 as shown in FIG. 2. In some embodiments, method 300 may be performed by electronic device 120 as shown in FIG. 1. It should be understood that method 300 may also include additional blocks not shown and/or may omit the blocks shown, and the scope of the present disclosure is not limited in this regard.

At block 302, electronic device 120 determines an optimal candidate fitting model from the at least one candidate fitting model 130 based on the evaluation information for the at least one candidate fitting model 130. In some embodiments, in cases where the evaluation information indicates only a historical fitting degree between the at least one candidate fitting model 130 and a set of historical data, electronic device 120 may determine candidate fitting model 130 in the at least one candidate fitting model 130 that has the optimal historical fitting degree as the optimal candidate fitting model. In some other embodiments, in cases where the evaluation information indicates a plurality of different evaluation metrics, electronic device 120 may, for example, determine an evaluation value associated with the corresponding candidate fitting model 130 based on the evaluation information and determine the optimal candidate fitting model based on the determined evaluation value.

As an example, in cases where the evaluation information indicates the historical fitting degree, the time overhead, the storage overhead, and the most recently used moment as mentioned above, electronic device 120 may calculate the evaluation value associated with the corresponding candidate fitting model 130 based on Equation (1) as follows.

$$E(A) = \frac{D(A)}{TO(A) * SO(A) * (\text{current\_time} - LSPT(A))} \quad (1)$$

where A denotes a candidate fitting model to be evaluated, E(A) denotes an evaluation value associated with candidate fitting model A, D(A) denotes a historical fitting degree between candidate fitting model A and corresponding historical data, TO(A) denotes the time overhead used by candidate fitting model A to fit the corresponding historical data, SO(A) denotes the storage overhead used by candidate fitting model A to fit the corresponding historical data, current_time denotes the current time, and LSPT(A) denotes the most recently used moment associated with candidate fitting model A.

In this example, electronic device 120 may determine candidate fitting model 130 with the highest evaluation value as the optimal candidate fitting model. In other words, electronic device 120 tends to determine candidate fitting model 130 that has a relatively good historical fitting degree, a relatively low time overhead, and a relatively low storage overhead and has been used recently as the optimal candidate fitting model. In this way, the performance of candidate fitting models can be measured comprehensively in several dimensions, so as to select the fitting model that best meets the requirements therefrom. It should be noted that Equation (1) is only intended to provide an example approach to determine the evaluation value, and the evaluation value may also be determined in any other suitable way based on the evaluation information, for example, by calculating a weighted sum of all metrics included in the evaluation information. The scope of the present disclosure is not limited in this regard.

It should be understood that, in addition to determining the evaluation value based on the evaluation information, the optimal candidate fitting model may also be determined from the at least one candidate fitting model 130 in any other suitable manner, and the scope of the present disclosure is not limited in this regard.

At block 304, electronic device 120 may set the probability that the optimal candidate fitting model is selected to a first probability value. In some embodiments, the first probability value may be a predetermined value, such as 40%. In some embodiments, the first probability value may be a variable value.

In some embodiments, electronic device 120 may count the model selection strategies to determine a cumulative number of model selection strategies, and electronic device 120 may set the first probability value to increase as that cumulative number increases. In a specific example, the first probability value may have an initial value of 50%, and the first probability value may increase by 10% each time the cumulative number increases by 1, until it increases to 100%, and the first probability value is then always maintained at 100%. This means that after the cumulative number of model selection strategies is greater than 5, the first probability value will remain at 100%, that is, subsequent model selection strategies will always instruct to select the determined optimal candidate fitting model without trying other candidate fitting models 130. In this way, electronic device 120 can directly select the optimal candidate fitting model determined according to the stored evaluation information as target fitting model 140 after accumulating certain model selection experiences, for use in determining the storage state of storage device 110 over the second time period. By reasonably setting the first probability value and its variation rules, the method according to this embodiment can strike a proper balance between utilizing the optimal candidate fitting model and exploring candidate fitting model 130, thereby determining target fitting model 140 with relatively good performance at a relatively high efficiency. Thus, compared with conventional solutions that always try candidate fitting models 130 in a predetermined order, the method according to this embodiment can further reduce the number of trials required to determine target fitting model 140, thereby reducing system overhead and improving the prediction efficiency and prediction quality. It should be understood that the first probability value may also be set in any other suitable manner, and the scope of the present disclosure is not limited in this regard.

In some embodiments, a threshold N of the number of trials may also be preset, and the first probability value is set to 100% after the number of model selection strategies is greater than the threshold N of the number of trials. In this case, electronic device 120 consistently determines the optimal candidate fitting model as target fitting model 140 after trying a certain number of candidate fitting models 130. In this way, it is possible to avoid trying the remaining candidate fitting models 130 in the subsequent prediction process, thereby further saving system overhead and improving prediction efficiency.

At block 306, electronic device 120 determines a model selection strategy based on the first probability value. In some embodiments, electronic device 120 may determine a probability value obtained by subtracting the first probability value from 100% as a second probability value and distribute the second probability value equally among the remaining candidate fitting models 130 other than the optimal candidate fitting model in the set of candidate fitting models 130. In other words, electronic device 120 may randomly select one candidate fitting model 130 from the remaining candidate fitting models 130 with the second probability value. As an example, when the first probability value is 50% and the set of candidate fitting models 130 has a total of 6 candidate fitting models 130, electronic device 120 may determine a model selection strategy as follows: the probability of the optimal candidate fitting model being selected is 50%, and the probability of the remaining 5 candidate fitting models 130 being selected is 10%.

In some embodiments, electronic device 120 may determine a probability value obtained by subtracting the first probability value from 100% as a second probability value and distribute the second probability value equally among candidate fitting models 130 in the set of candidate fitting models 130 that have not yet been tried. In this case, in the subsequent model selection process, electronic device 120 may no longer consider candidate fitting models 130 among the previously tried candidate fitting models 130 that have lower performance than the optimal candidate fitting model. In this manner, the efficiency of model selection can be further improved, thereby saving system overhead.

It should be understood that a model selection strategy may also be determined based on the first probability value in any other suitable manner, and the scope of the present disclosure is not limited in this regard.

As can be seen from the above description in conjunction with FIGS. 1 to 3, by considering previously determined evaluation information associated with at least one candidate fitting model, the method for managing a storage device according to the present disclosure may determine a target fitting model from a set of candidate fitting models for use in predicting a storage state of the storage device over a future time period. Compared with conventional solutions that try candidate fitting models in a predetermined order, since the previously determined evaluation information is considered in the model selection process, the fitting model most suitable for actual business data can be determined more efficiently from the set of candidate fitting models according to the method of the present disclosure, so that the number of trials on candidate fitting models in the subsequent prediction process can be reduced to avoid undesired system overhead.

Figure 4:
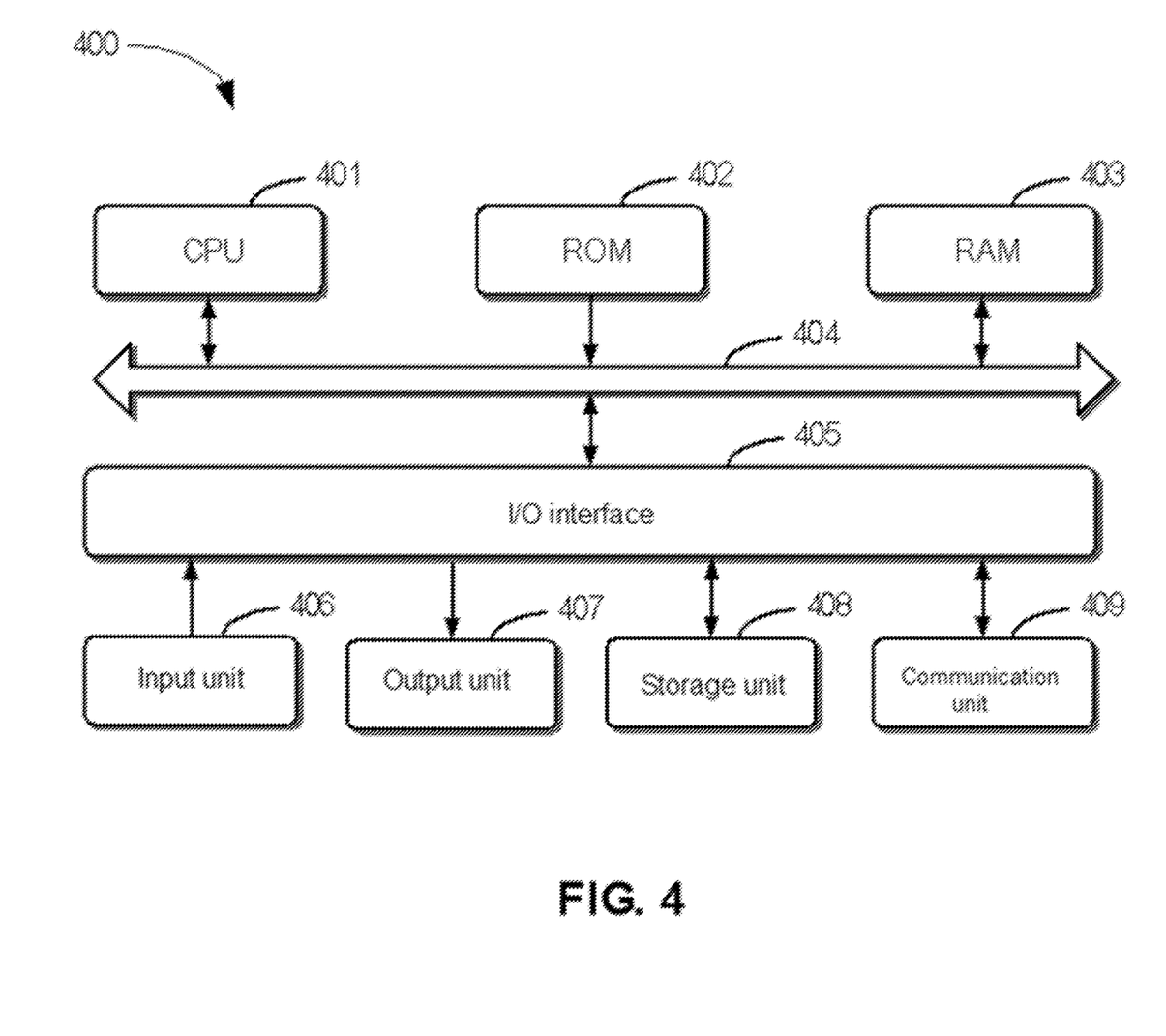
FIG. 4 illustrates a schematic block diagram of an example device that may be used to implement embodiments of the present disclosure.

FIG. 4 illustrates a schematic block diagram of example device 400 that can be used to implement embodiments of the present disclosure. As shown in FIG. 4, device 400 includes central processing unit (CPU) 401 which may perform various appropriate actions and processing according to computer program instructions stored in read-only memory (ROM) 402 or computer program instructions loaded from storage unit 408 to random access memory (RAM) 403. Various programs and data required for the operation of device 400 may also be stored in RAM 403. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disc; and communication unit 409, such as a network card, a modem, and a wireless communication transceiver. Communication unit 409 allows device 400 to exchange information/data with other devices via a computer network, such as the Internet, and/or various telecommunication networks.

The various processes and processing described above, such as method 200 and method 300, may be performed by processing unit 401. For example, in some embodiments, method 200 and method 300 may be implemented as a computer software program that is tangibly included in a machine-readable medium, such as storage unit 408. In some embodiments, part of or all the computer program may be loaded and/or installed onto device 400 via ROM 402 and/or communication unit 409. When the computer program is loaded to RAM 403 and executed by CPU 401, one or more actions of methods 200 and 300 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

What is claimed is:

1. A method, comprising:
    acquiring, by a system comprising at least one processor, evaluation information for at least one candidate fitting model in a set of candidate fitting models, wherein the evaluation information indicates at least a historical fitting degree between the at least one candidate fitting model and a set of historical data, the set of historical data indicating a storage state of the storage device over at least one historical time period;
    determining a model selection strategy based on the evaluation information, wherein the model selection strategy indicates at least a probability that the set of candidate fitting models is selected for fitting target data, the target data indicating a first storage state of the storage device over a first time period; and
    determining, based on the model selection strategy, a target fitting model from the set of candidate fitting models for use in determining a second storage state of the storage device over a second time period, wherein determining the target fitting model comprises:
        determining a first fitting model from the set of candidate fitting models based on the model selection strategy;
        updating the evaluation information using a fitting degree between the first fitting model and the target data;
        updating the model selection strategy based on the updated evaluation information and in response to determining that the fitting degree is less than a predetermined threshold, the updating resulting in an updated model selection strategy; and
        determining the target fitting model from the set of candidate fitting models based on the updated model selection strategy.

2. The method according to claim 1, wherein determining the model selection strategy comprises:
    determining an optimal candidate fitting model from the at least one candidate fitting model based on the evaluation information of the at least one candidate fitting model.

3. The method according to claim 2, wherein determining the model selection strategy further comprises:
    setting the probability that the optimal candidate fitting model is selected to a first probability value; and
    determining the model selection strategy based on the first probability value.

4. The method according to claim 3, further comprising:
    counting the model selection strategies to determine a cumulative number of the model selection strategies, wherein the first probability value increases as the cumulative number increases.

5. The method according to claim 1, further comprising:
    updating, using the fitting degree between the first fitting model and the target data, the evaluation information for use in determining a third storage state of the storage device over a third time period after the second time period.

6. The method according to claim 1, wherein the evaluation information further indicates a time overhead or storage overhead used by the at least one candidate fitting model to fit the set of historical data.

7. The method according to claim 1, wherein the evaluation information further indicates a moment at which the at least one candidate fitting model is selected for determining storage state of the storage device.

8. A device, comprising:
    at least one processor; and
    a memory coupled to the at least one processor, the memory having instructions stored therein that, when executed by the at least one processor, cause the device to execute operations comprising:
    acquiring evaluation information for a candidate fitting model of candidate fitting models, wherein the evaluation information indicates at least a historical fitting degree between the candidate fitting model and historical data indicating a previous storage state of a storage device over a historical time period;
    determining a model selection strategy based on the evaluation information, wherein the model selection strategy at least indicates a probability that at least one of the candidate fitting models will be selected for fitting target data, the target data indicating a first storage state of the storage device over a first time period; and
    determining, based on the model selection strategy, a target fitting model from the candidate fitting models for use in determining a second storage state of the storage device over a second time period, wherein determining the target fitting model comprises:
        determining a first fitting model from the candidate fitting models based on the model selection strategy;
        updating the evaluation information using a fitting degree between the first fitting model and the target data;
        updating the model selection strategy based on the updated evaluation information and in response to determining that the fitting degree is less than a predetermined threshold, the updating resulting in an updated model selection strategy; and
        determining the target fitting model from the candidate fitting models based on the updated model selection strategy.

9. The device according to claim 8, wherein determining the model selection strategy comprises:
    determining that the candidate fitting model is an optimal candidate fitting model based on the evaluation information of the candidate fitting model.

10. The device according to claim 9, wherein determining the model selection strategy further comprises:
    setting the probability that the optimal candidate fitting model will be selected to a probability value; and
    determining the model selection strategy based on the probability value.

11. The device according to claim 10, wherein the operations further comprise:

counting the model selection strategies to determine a cumulative number of the model selection strategies, wherein the probability value increases as the cumulative number increases.

12. The device according to claim 8, wherein the operations further comprise:
updating, using the fitting degree between the first fitting model and the target data, the evaluation information for use in determining a third storage state of the storage device over a third time period after the second time period.

13. The device according to claim 8, wherein the evaluation information further indicates a time overhead or storage overhead used by the candidate fitting model to fit the historical data.

14. The device according to claim 8, wherein the evaluation information further indicates a moment at which the candidate fitting model is selected for determination of storage state of the storage device.

15. A computer program product that is stored on a non-transitory computer-readable medium and comprising machine-executable instructions that, when executed, cause a machine to perform operations, comprising:
acquiring evaluation information for a candidate fitting model of candidate fitting models, wherein the evaluation information indicates at least a historical fitting degree between the candidate fitting model and historical data indicating a previous storage state of a storage device over a historical time period;
determining a model selection strategy based on the evaluation information, wherein the model selection strategy at least indicates a probability that at least one of the candidate fitting models will be selected for fitting target data, the target data indicating a first storage state of the storage device over a first time period; and
determining, based on the model selection strategy, a target fitting model from the candidate fitting models for use in determining a second storage state of the storage device over a second time period, wherein determining the target fitting model comprises:
determining a first fitting model from the candidate fitting models based on the model selection strategy,
updating the evaluation information using a fitting degree between the first fitting model and the target data,
updating the model selection strategy based on the updated evaluation information and in response to determining that the fitting degree is less than a predetermined threshold, the updating resulting in an updated model selection strategy, and
determining the target fitting model from the candidate fitting models based on the updated model selection strategy.

16. The computer program product according to claim 15, wherein determining the model selection strategy comprises:
determining that the candidate fitting model is an optimal candidate fitting model based on the evaluation information of the candidate fitting model.

17. The computer program product according to claim 16, wherein the operations further comprise:
setting the probability that the optimal candidate fitting model will be selected to a probability value; and
determining the model selection strategy based on the probability value.

18. The computer program product according to claim 17, wherein the operations further comprise:
counting the model selection strategies to determine a cumulative number of the model selection strategies, wherein the probability value increases as the cumulative number increases.

19. The computer program product according to claim 15, wherein determining the target fitting model further comprises:
updating, using the fitting degree between the first fitting model and the target data, the evaluation information for use in determining a third storage state of the storage device over a third time period after the second time period.

20. The computer program product according to claim 15, wherein the evaluation information further indicates at least one of: a time overhead or storage overhead used by the candidate fitting model to fit the historical data, or a moment at which the candidate fitting model is selected for determination of storage state of the storage device.

* * * * *